United States Patent
Chang

(10) Patent No.: US 9,958,000 B2
(45) Date of Patent: May 1, 2018

(54) FASTENER FOR CORRUGATED SHEET

(71) Applicant: San-He Chang, Taipei (TW)

(72) Inventor: San-He Chang, Taipei (TW)

( * ) Notice: Subject to any disclaimer, the term of this patent is extended or adjusted under 35 U.S.C. 154(b) by 68 days.

(21) Appl. No.: 15/190,256

(22) Filed: Jun. 23, 2016

(65) Prior Publication Data

US 2017/0370399 A1 Dec. 28, 2017

(51) Int. Cl.
| | |
|---|---|
| F16B 13/06 | (2006.01) |
| F16B 43/00 | (2006.01) |
| F16B 35/00 | (2006.01) |
| F16B 39/02 | (2006.01) |
| E04D 3/24 | (2006.01) |
| E04D 3/36 | (2006.01) |
| F16B 13/00 | (2006.01) |

(52) U.S. Cl.
CPC .............. *F16B 43/001* (2013.01); *E04D 3/24* (2013.01); *E04D 3/3606* (2013.01); *F16B 35/00* (2013.01); *F16B 39/02* (2013.01); *F16B 13/066* (2013.01); *F16B 2013/006* (2013.01)

(58) Field of Classification Search
CPC .............. F16B 13/066; F16B 2013/006; F16B 2013/007
USPC ......................................... 411/60.1–60.3, 55
See application file for complete search history.

(56) References Cited

U.S. PATENT DOCUMENTS

| | | | | |
|---|---|---|---|---|
| 1,352,494 | A * | 9/1920 | Zifferer | F16B 13/066 411/42 |
| 3,503,298 | A * | 3/1970 | Van Thiel | F16B 13/066 411/53 |
| 4,019,420 | A * | 4/1977 | Fischer | E04F 13/0801 411/49 |
| 4,611,485 | A * | 9/1986 | Leslie | F28F 11/02 138/90 |
| 4,968,200 | A * | 11/1990 | Mark | F16B 13/065 411/55 |
| 5,284,409 | A * | 2/1994 | Miyanaga | F16B 13/0858 411/55 |
| 5,816,760 | A * | 10/1998 | Mattner | F16B 13/004 411/30 |
| 2007/0098518 | A1 * | 5/2007 | Rosenkranz | F16B 13/066 411/60.2 |

* cited by examiner

Primary Examiner — Flemming Saether

(57) ABSTRACT

A fastener for a corrugated sheet includes a cylindrical assembly including elongated, plate shaped fastening members assembled as a hollow cylinder. Each fastening member is tapered to one end to form a hook at one end and having a curved groove on an outer surface, and a curved trough on the outer surface at the other end of the fastening member. The curved troughs are assembled to form an annular recess. A retainer ring is secured to the annular recess. A ring-shaped elastic member is secured to the curved groove. A first sealing member is put on the retainer ring. A threaded bolt driven through a washer, the retainer ring, and the fastening member. An expansion nut has a multi-sided outer surface and is moveably secured to the threaded bolt.

5 Claims, 6 Drawing Sheets

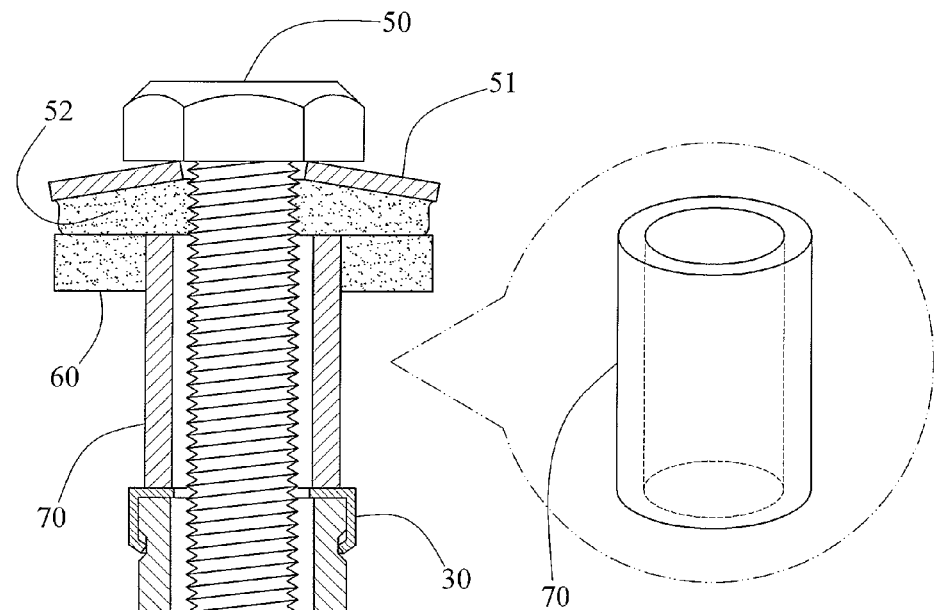
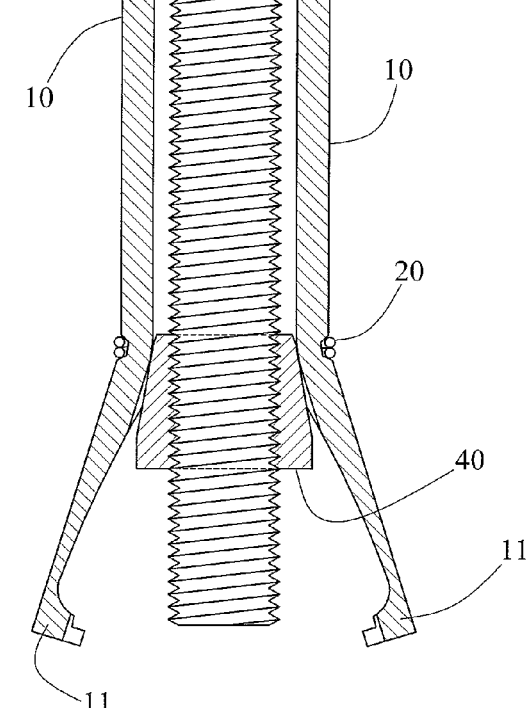
FIG. 5A
FIG. 5

FASTENER FOR CORRUGATED SHEET

BACKGROUND OF THE INVENTION

1. Field of the Invention

The invention relates to fastening of corrugated sheets and, more particularly, to a fastener for a corrugated sheet having a sealing member fastened between a support and a corrugated sheet so that a fastened structure can be waterproof. Moreover, splayed hooks fastened in a steel member are capable of greatly increasing the structural strength of both the support and the corrugated sheet, thereby withstanding heavy rain and winds.

2. Description of Related Art

Many patios, factories and buildings have corrugated sheet roofs. A corrugated sheet roof has the functions of preventing rain from entering the building, preventing sunlight from directly entering the building, and being a heat barrier. The corrugated sheet roofs are easy to construct and inexpensive. Typically, a corrugated sheet and a structure attached thereto are fastened by threaded fasteners (e.g., screws). Only the threaded shank of the screw is through the corrugated sheet, and, thus, it is not sufficiently secure. It is possible that in inclement weather, rain may enter the building through the joining portion of the screw and the corrugated sheet. To the worse, strong winds may blow the corrugated sheet away, to not only damage the building but also hurt or even kill people.

Thus, the need for improvement exists.

SUMMARY OF THE INVENTION

It is therefore one object of the invention to provide a fastener for a corrugated sheet comprising a cylindrical assembly including a plurality of elongated, plate shaped fastening members assembled as a hollow cylinder, with each fastening member tapered to one end to form a hook at one end and having a curved groove on an outer surface, with a curved trough on the outer surface at the other end of the fastening member, and with the curved troughs assembled to form an annular recess; a retainer ring secured to the annular recess and having an opening at one end; a ring-shaped elastic member secured to the curved groove; a first sealing member put on a peripheral surface of the retainer ring; a washer; a threaded bolt driven through the washer, the retainer ring, and the fastening members to have an open end proximate to the hooks; and an expansion nut having a multi-sided outer surface and moveably secured to the threaded bolt, with the expansion nut being surrounded by the hooks.

Preferably, the expansion nut includes a plurality of spaced flats and a plurality of raised portions each between two adjacent flats, with the expansion nut tapered to one end facing the retainer ring.

Preferably, a second sealing member is fastened below the washer.

Preferably, a sleeve is mounted between the second sealing member and the retainer ring, with one end of the sleeve urged against the retainer ring, and with the other end thereof urged against the second sealing member.

Preferably, the threaded bolt is configured to drive through the cylindrical assembly, the expansion nut is configured to move along the threaded bolt, and the threaded bolt is configured to further drive through a support, a corrugated sheet, and a steel member to fasten together.

Preferably, a bottom of the corrugated sheet is fastened on the steel member, and a top thereof is secured to the support.

Preferably, the first sealing member is shaped as a ring and implemented as a pad made of thermoplastic.

The above and other objects, features and advantages of the invention will become apparent from the following detailed description taken with the accompanying drawings.

BRIEF DESCRIPTION OF THE DRAWINGS

FIG. 5 is a longitudinal sectional view of a fastener according to a second preferred embodiment of the invention;

FIG. 5A is a perspective view of the sleeve; and

DETAILED DESCRIPTION OF THE INVENTION

Figure 1:
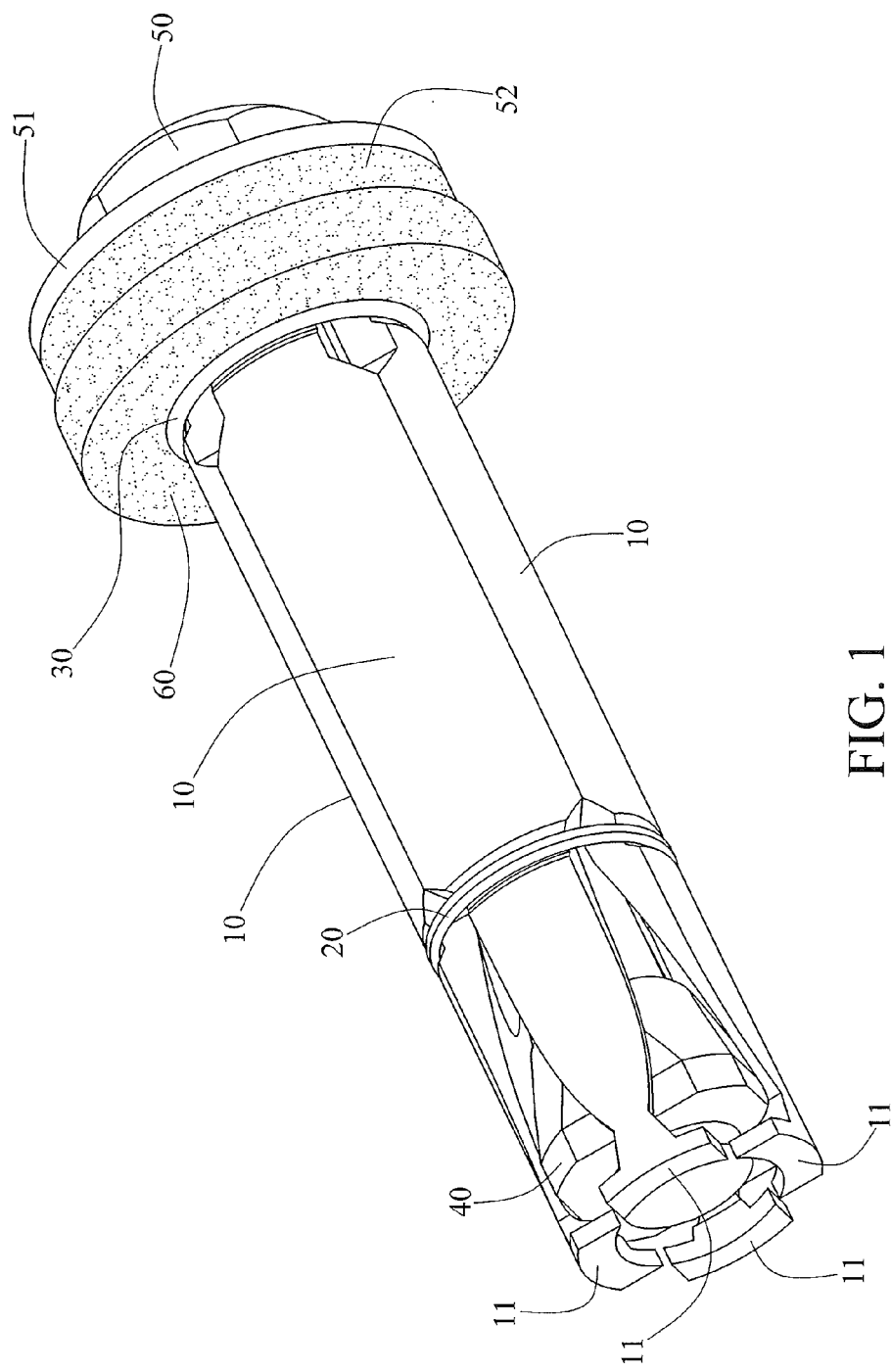
FIG. 1 is a perspective view of a fastener for corrugated sheet according to a first preferred embodiment of the invention.
Figure 2:
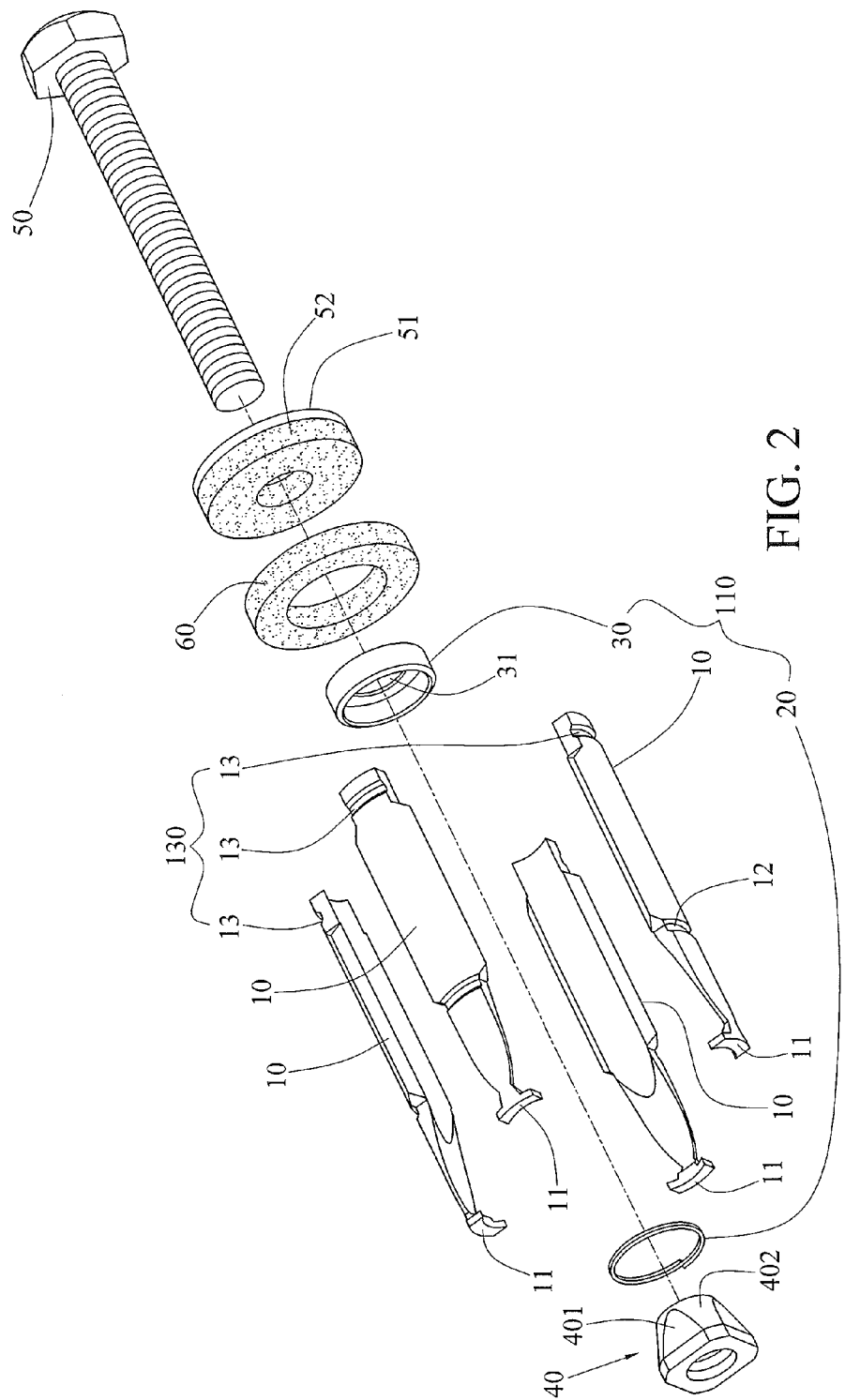
FIG. 2 is an exploded view of the fastener.
Figure 3:
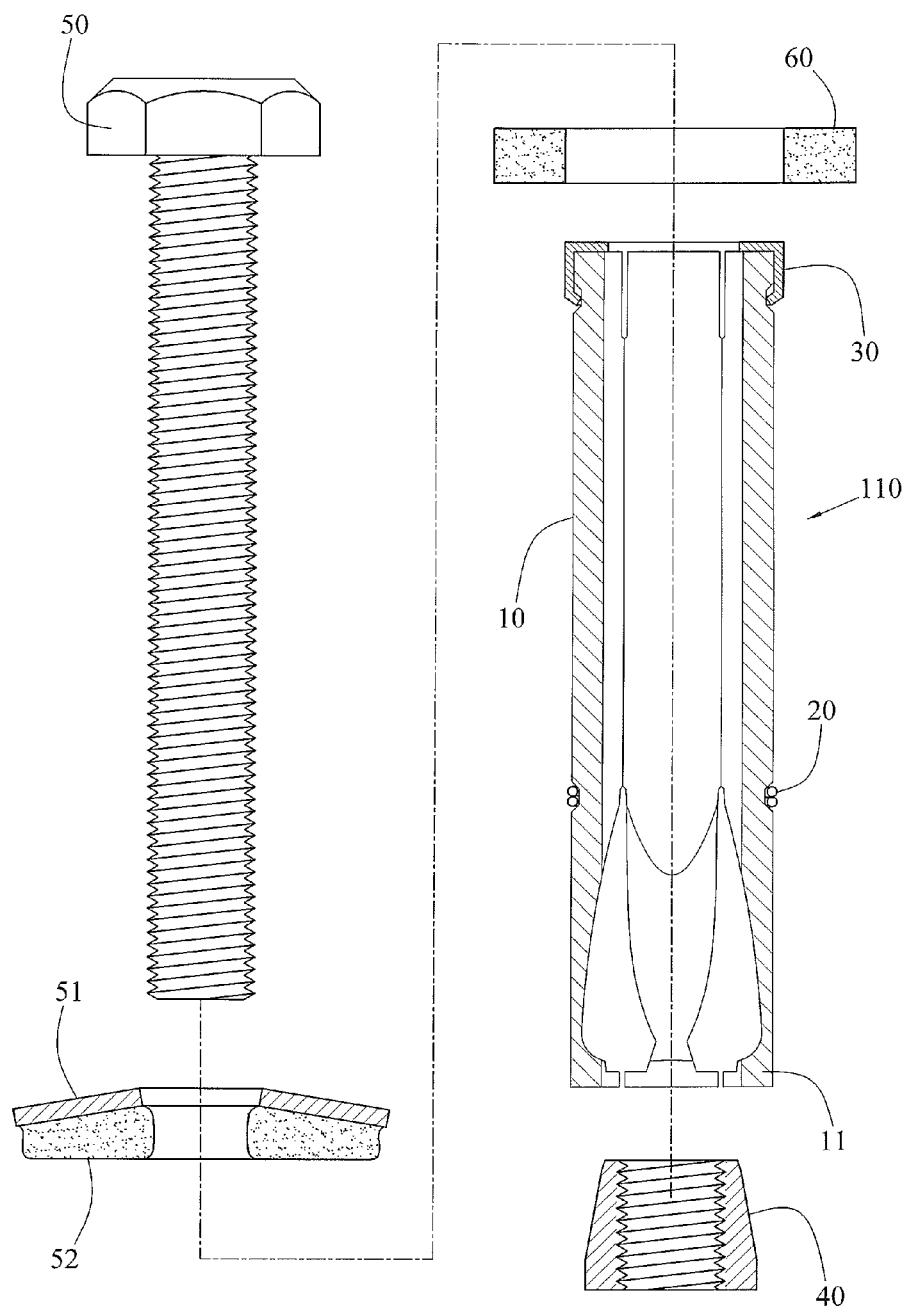
FIG. 3 is an exploded, longitudinal sectional view of the fastener.
Figures 4, 4A:
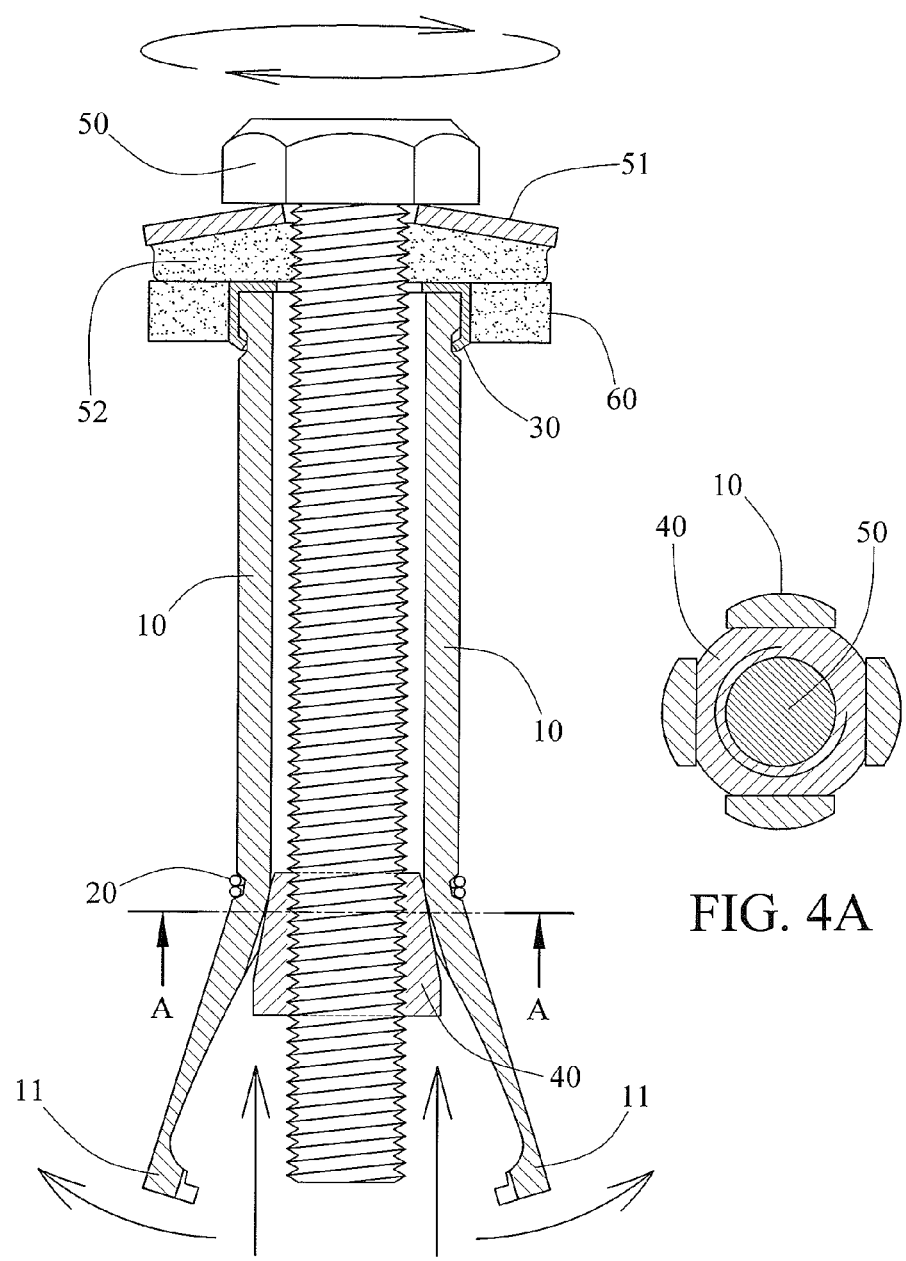
FIG. 4 is a longitudinal sectional view of the assembled fastener of FIG. 3 with the fastener being expanded.
FIG. 4A is a sectional view taken along line A-A of FIG. 4.

Referring to FIGS. 1 to 4A, a fastener for corrugated sheet in accordance with a first preferred embodiment of the invention comprises the following components as discussed in detail below.

A cylindrical assembly 110 includes a plurality of elongated, plate shaped fastening members 10 assembled as a hollow cylinder. Each fastening member 10 is tapered to one end to form a hook 11 at one end and having a curved groove 12 on an outer surface adjacent to the position that the fastening member 10 tapers, with a curved trough 13 on the outer surface at the other end of the fastening member 10. The curved troughs 13 are assembled to form an annular recess 130. A retainer ring 30 is secured to the annular recess 130 and has an opening 31 at one end. A ring-shaped elastic member 20 is secured to the curved grooves 12 of the plurality of fastening members 10. A first sealing member 60 is on a peripheral surface of the retainer ring 30. A second sealing member 52 is disposed on the first sealing member 60. A washer 51 is disposed on the second sealing member 52. A threaded bolt 50 is driven through the washer 51, the second sealing member 52, the retainer ring 30, and the fastening member 10 to have an open end proximate to the hooks 11. An expansion nut 40 has a multi-sided outer surface and is moveably secured to the bolt 50. The expansion nut 40 is surrounded by the hooks 11.

The expansion nut 40 includes a plurality of spaced flats 401 and a plurality of raised portions 402 each between two adjacent flats 401. The expansion nut 40 tapers to one end facing the retainer ring 30.

A person may threadedly move the expansion nut 40 along the threads of the bolt 50 by splaying the hooks 11 apart until the expansion nut 40 is disposed at a position proximate to the elastic ring 20, with the raised portions 402 urging against an inner surface of the fastening member 10. As a result, the fastening member 10 is fastened.

Preferably, both first and second sealing members 60, 52 are made of a waterproof material to prevent water from entering the fastening member 10 through the opening 31. Otherwise, the fastener may become rusted.

Preferably, both first and second sealing members 60, 52 are shaped as a ring and are implemented as a pad made of thermoplastic.

Figure 6:
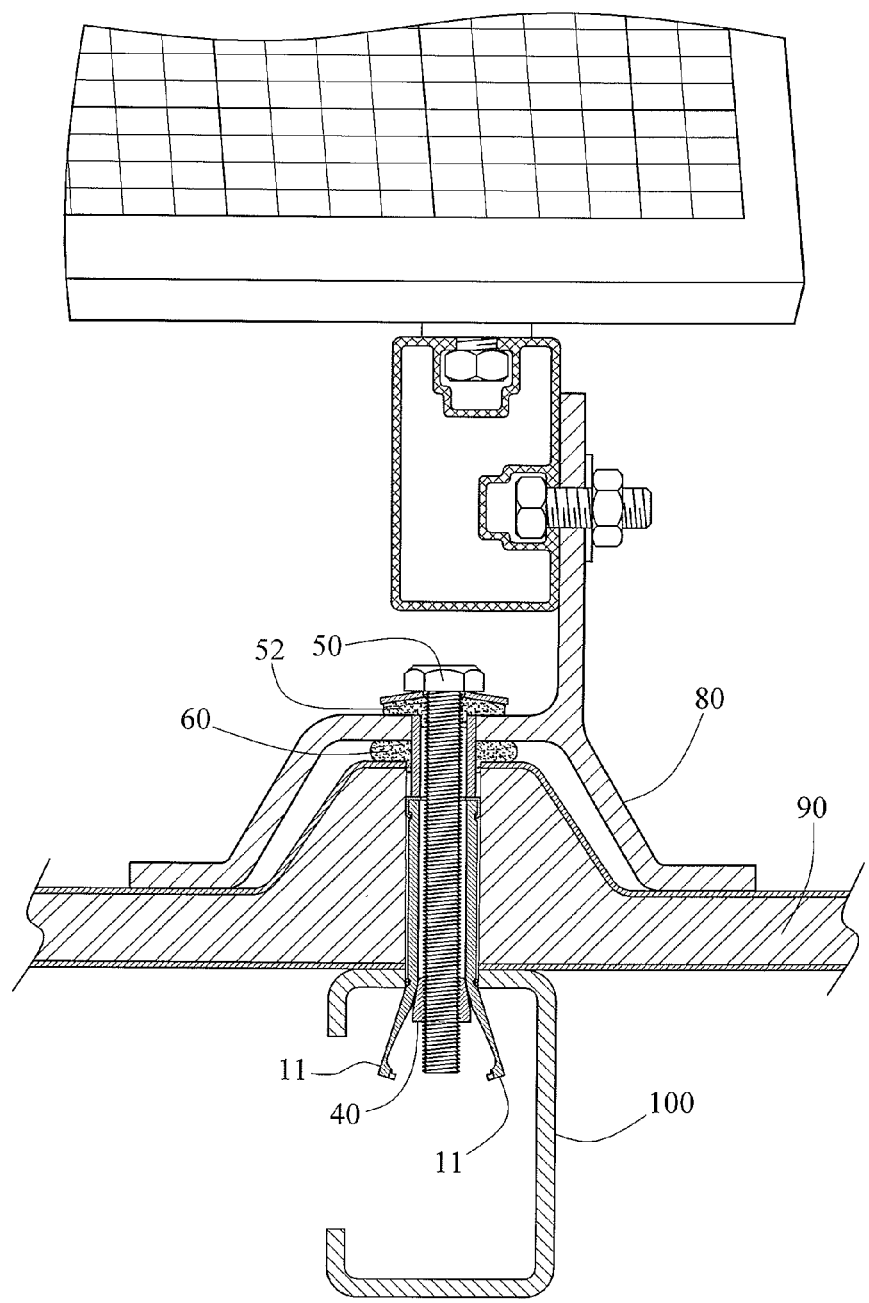
FIG. 6 is a sectional view schematically showing the fastener of the second preferred embodiment mounted on a roof made of corrugated sheet.

Referring to FIGS. 5 to 6, a fastener for corrugated sheet in accordance with a second preferred embodiment of the invention is shown. The characteristics of the second preferred embodiment are substantially the same as that of the first preferred embodiment except the following:

A sleeve 70 is mounted between the second sealing member 52 and the retainer ring 30. That is, one end of the sleeve 70 urges against the retainer ring 30, and the other end thereof urges against the second sealing member 52.

Referring to FIGS. 1 to 6 again, in a fastening operation, a person may drive the threaded bolt 50 through the washer 51, the second sealing member 52, a support 80, the sleeve 70, the first sealing member 60, a corrugated sheet 90, the fastening member 10, and a steel member 100 to have an open of the threaded bolt 50 proximate to the hooks 11. Next, the expansion nut 40 is threadedly moved along the threads of the bolt 50 by splaying the hooks 11 apart until the expansion nut 40 is disposed at a position proximate to the elastic member 20 with the raised portions 402 urging against an inner surface of the fastening member 10. As a result, the fastener, the support 80, the corrugated sheet 90, and the steel member 100 are fastened together.

Preferably, a bottom of the corrugated sheet 90 is fastened on the steel member 100, and a top thereof is secured to the support 80.

Prior to fastening, positions of the support 80, the corrugated sheet 90 and the steel member 100 to be drilled should be chosen. Thereafter, in a next fastening operation, the cylindrical assembly 110 can be driven through the support 80, the corrugated sheet 90 and the steel member 100. Also, the first sealing member 60 is clamped by and between the support 80 and the corrugated sheet 90. Next, the threaded bolt 50 is driven through the second sealing member 52 into the cylindrical assembly 110 and threadedly moves the expansion nut 40 along the threads of the bolt 50 by splaying the hooks 11 apart by bending the fastening member 10 at the curved grooves 12 and expanding the elastic member 20 until the expansion nut 40 is disposed at a position proximate to the elastic member 20 with the raised portions 402 urging against an inner surface of the fastening member 10. Finally, the support 80 is threadedly secured to a structure, for example, a cooling tower, a water tank, a solar panel, or a satellite dish. As a result, the fastening operation is completed.

The provision of the sleeve 70 between the second sealing member 52 and the retainer ring 30 allows the fastener to secure to a structure having a greater thickness. Also, the first sealing member 60 is put on the sleeve 70.

It is noted that the first sealing member 60 is fastened between the support 80 and the corrugated sheet 90 so that the fastened structure can be waterproof. Moreover, the splayed hooks 11 fastened in the steel member 100 can greatly increase the structural strength of both the support 80 and the corrugated sheet 90. Thus, persons and equipment in a building can be protected. Also, the building can withstand heavy rain and winds.

While the invention has been described in terms of preferred embodiments, those skilled in the art will recognize that the invention can be practiced with modifications within the spirit and scope of the appended claims.

What is claimed is:

1. A fastener for a corrugated sheet comprising:
a cylindrical assembly including a plurality of elongated, plate shaped fastening members assembled as a hollow cylinder, with each fastening member tapered to one end to form a hook at the one end and having a curved groove on an outer surface, with a curved trough on the outer surface at another end of each fastening member, with the curved troughs of the plurality of fastening members assembled to form an annular recess;
a retainer ring secured to the annular recess and having an opening at one end;
a ring-shaped elastic member secured to the curved grooves of the plurality of fastening members;
a first sealing member put on a peripheral surface of the retainer ring, wherein the first sealing member is shaped as a ring and implemented as a pad made of thermoplastic;
a washer;
a threaded bolt driven through the washer, the retainer ring, and the plurality of fastening members to have an open end proximate to the hooks of the plurality of fastening members; and
an expansion nut having a multi-sided outer surface and moveably secured to the threaded bolt, with the expansion nut surrounded by the hooks of the plurality of fastening members.

2. The fastener of claim 1, wherein the expansion nut includes a plurality of spaced flats and a plurality of raised portions each between two adjacent flats, with the expansion nut tapered to one end facing the retainer ring.

3. The fastener of claim 1, further comprising a second sealing member fastened below the washer.

4. The fastener of claim 1, wherein the threaded bolt is configured to drive through the cylindrical assembly, the expansion nut is configured to move along the threaded bolt, and the threaded bolt is configured to further drive through a support, a corrugated sheet, and a steel member to fasten together.

5. The fastener of claim 4, wherein a bottom of the corrugated sheet is fastened on the steel member and a top of the corrugated sheet is secured to the support.

* * * * *